United States Patent [19]

Straub

[11] Patent Number: 5,692,757
[45] Date of Patent: Dec. 2, 1997

[54] BIDIRECTIONAL SHAFT SEAL WITH INTERSECTING SPIRAL GROOVES

[75] Inventor: Carole L. Straub, Ida, Mich.

[73] Assignee: Mather Seal Company, Southfield, Mich.

[21] Appl. No.: 277,549

[22] Filed: Jul. 19, 1994

[51] Int. Cl.$^6$ ..................................................... F16J 15/32
[52] U.S. Cl. ........................................ 277/134; 277/152
[58] Field of Search .......................... 277/38, 152, 134, 277/96.1

[56] References Cited

U.S. PATENT DOCUMENTS

| | | |
|---|---|---|
| 3,504,918 | 4/1970 | Halliday ................................ 277/134 |
| 3,620,540 | 11/1971 | Jagger et al. . |
| 3,672,690 | 6/1972 | Berens . |
| 3,857,156 | 12/1974 | Clark . |
| 3,913,925 | 10/1975 | Gyory . |
| 4,118,856 | 10/1978 | Bainard et al. . |
| 4,132,421 | 1/1979 | Corsi et al. ........................... 277/134 |
| 4,420,162 | 12/1983 | Yanai et al. . |
| 4,451,050 | 5/1984 | Repella ................................. 277/134 |
| 4,501,431 | 2/1985 | Peisker et al. ....................... 277/134 |
| 4,542,573 | 9/1985 | Bainard ................................ 277/134 |
| 4,986,552 | 1/1991 | Anzue et al. . |
| 4,986,553 | 1/1991 | Preston et al. . |

*Primary Examiner*—Scott W. Cummings
*Attorney, Agent, or Firm*—Lawrence J. Shurupoff

[57] ABSTRACT

A bidirectional hydrodynamic shaft seal includes an annular plastic disk having a sealing surface or lip provided with two connected spiral grooves extending around the disk axis. One of the spiral grooves spirals outwardly in a clockwise direction, and the other spiral groove spirals outwardly in a counterclockwise direction so that the spiral grooves have multiple intersection points. The shaft seal is designed for operation in either or both directions of shaft rotation.

9 Claims, 3 Drawing Sheets

BIDIRECTIONAL SHAFT SEAL WITH INTERSECTING SPIRAL GROOVES

BACKGROUND OF THE INVENTION

1. Field of the Invention

This invention relates to a shaft seal having an annular sealing disk which includes a sealing surface engageable with a shaft, and particularly relates to a spiral groove pattern formed in the sealing surface for preventing liquid lubricant from escaping from the lubricant side of the seal to the air side.

2. Description of Prior Developments

U.S. Pat. No. 3,857,156 to Clark discloses an oil seal having an annular sealing disk formed of a plastic material. The inner edge of the disk rides on the surface of a rotary shaft to prevent oil from moving along the shaft across the seal thereby preventing oil from escaping from a shaft bearing. The sealing disk has a spiral groove formed in its sealing surface in a direction that causes the groove to act as a pump for pumping oil toward the shaft bearing to counteract the tendency of the oil to escape across the sliding interface between the shaft and the disk sealing surface.

The spiral groove in the Clark patent is spiralled in a particular direction related to the direction of shaft rotation such that the groove pumps oil in the proper direction, i.e. in opposition to the leakage direction. If the shaft is movable in two directions, i.e. clockwise and counterclockwise, the spiral groove will be relatively ineffective as a sealing aid when the shaft is rotating in one of the two directions.

U.S. Pat. No. 3,620,540 issued to Jagger shows a shaft seal that includes an elastomeric sealing element having a multiplicity of ridges on its sealing surface. The ridges are arranged in a criss-cross pattern around the sealing surface so as to form liquid-receiving pockets or channels in the sealing surface.

The ridges are obliquely angled to the shaft rotational plane so that pressurized oil rotating with the shaft strikes selected ridges so as to be reflected obliquely away from the ridges. Due to the cross-cross nature of the ridges, the ridge system functions in either direction of shaft motion, i.e. clockwise or counterclockwise.

U.S. Pat. No. 3,672,690 issued to Berens shows a seal mechanism that includes a sealing band or lip having a wedge-shaped profile. A plurality of wave-shaped flutes is provided on the air side of the sealing edge for sweeping oil back across the edge into the oil side of the seal. The wave-shaped flutes criss-cross one another so as to be effective in either direction of shaft rotation.

U.S. Pat. No. 4,420,162 issued to Yanai et al. shows a shaft seal wherein an annular sealing element has a flat surface containing two sets of narrow or fine grooves in criss-cross relation. One set of grooves distributes a lubricant film on the flat surface of the sealing element, whereas the other set of grooves directs or pumps lubricant back toward the lubricant side of the seal.

SUMMARY OF THE INVENTION

This invention relates to a shaft seal adapted for use on a shaft that is rotatable in either direction. An annular, wear-resistant sealing disk oriented in a radial plane normal to the shaft axis includes an inner edge which is turned axially to ride on the shaft surface to provide a dynamic seal.

The sealing surface of the disk has at least one spiral groove formed therein for pumping a liquid, such as lubricant, in the direction of the liquid side of the seal regardless of the direction of shaft rotation. The groove spirals in opposite directions for at least one full turn around the seal central axis.

DETAILED DESCRIPTION OF THE PREFERRED EMBODIMENT

Figure 1:
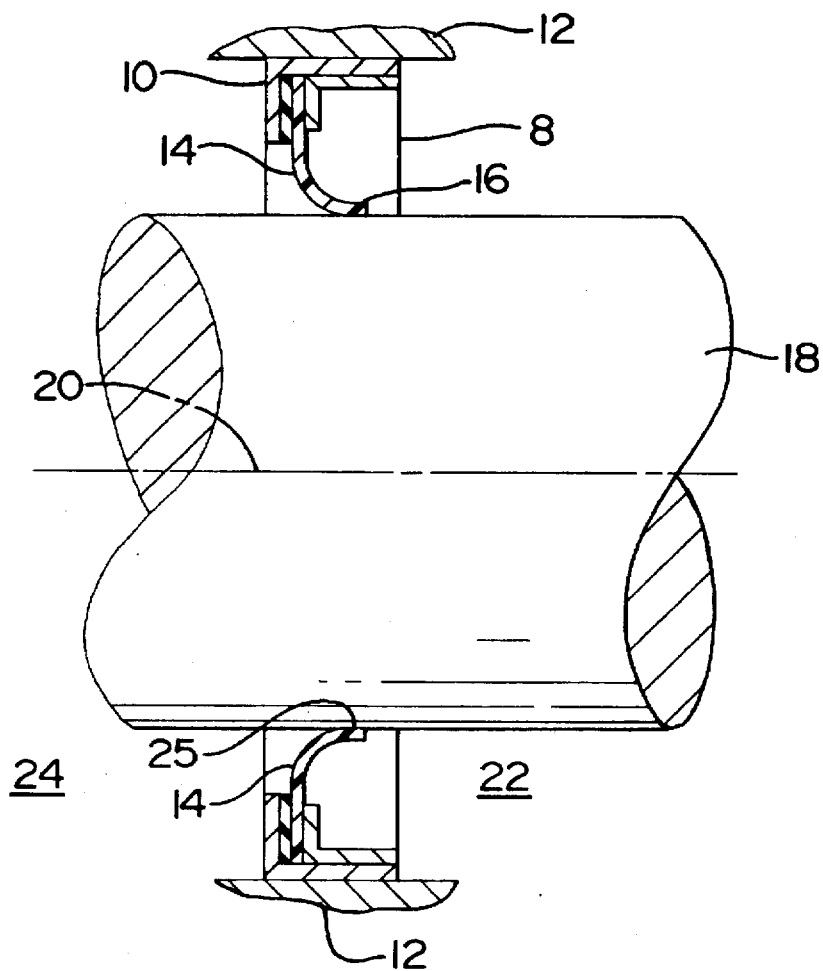
FIG. 1 is a transverse cross sectional view of a shaft seal mechanism constructed according to the invention.

FIG. 1 of the drawings shows a shaft seal 8 that includes a metal case 10 which is press fit in a stationary housing 12. An annular sealing disk 14 is mounted in the metal case 10 so that an inner annular edge area 16 of the disk has sliding contact with the surface of a shaft 18. The shaft may be mounted in anti-friction bearings so as to rotate around a central axis 20. Although a case 10 is shown, disk 14 may be clamped or mounted directly to housing 12 without case 10.

Liquid, such as lubricant for the shaft bearings, is contained in the annular zone 22 to the right of seal 8. The seal prevents the liquid from migrating across the seal to the zone 24 located to the left of the seal in FIG. 1, i.e. the air side of the seal.

Sealing disk 14 may be formed of polytetrafluoroethylene ("PTFE") or similar wear-resistant plastic material suitable for seal lip applications. Initially, the disk is in the form of a flat, annular, flexible washer having an axial thickness of about 0.04 inch. During the process of installing the plastic disk in metal case 10, the disk has its inner edge area curved into an axial configuration as depicted in FIG. 1 of the drawings.

Figure 2:
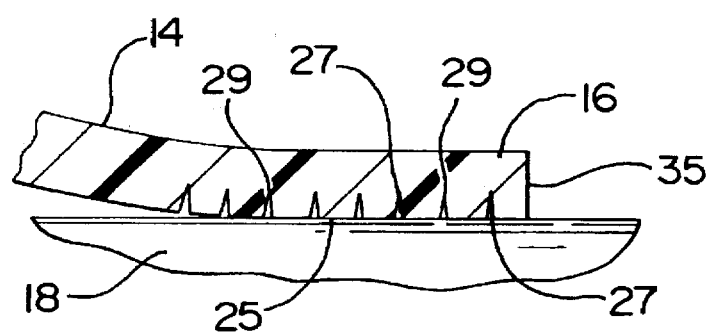
FIG. 2 is a fragmentary, enlarged sectional view taken through a sealing disk used in the FIG. 1 shaft seal mechanism.

FIG. 2 shows, in magnified form, the inner edge area of disk 14 wherein sealing surface 25 on the disk has two narrow grooves 27 and 29 extending along the shaft surface for distributing liquid lubricant onto the sealing surface 25. While the shaft is rotating in either direction, the groove system circulates lubricant through the grooves and back to the lubricant zone 22.

Figure 3:
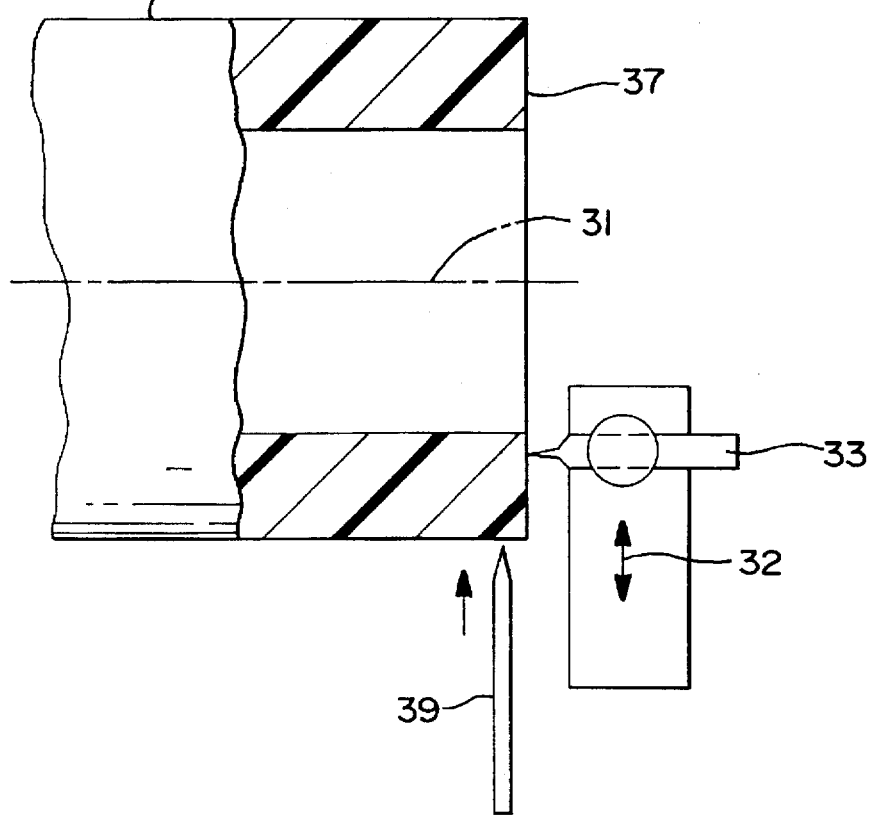
FIG. 3 illustrates a cutting arrangement that can be used to form the sealing disk used in the FIG. 1 shaft seal mechanism.

FIG. 3 shows one method of forming the sealing disk 14. An annular billet 30 which may be formed of PTFE is mounted for rotation around a central axis 31. As indicated by directional arrow 32, a grooving tool 33 is continuously advanced radially away from and then immediately back toward axis 31 using an uninterrupted, continuous machine cutting cycle to form two spiral grooves in end surface 37 of the billet.

The rotational speed of the billet is coordinated with the radial feed rate of the grooving tool 33 to control the angles of the two spiral grooves 27 and 29. The grooving apparatus can be similar to that described in U.S. Pat. No. 3,857,156. The billet rotational speed and radial feed rate of tool 33 are controlled by a suitable computer program associated with a numerically-controlled cutting machine used for the grooving operation.

After the two spiral grooves have been formed in the end face 37 of the billet, a cut-off tool 39 is advanced radially toward the billet rotational axis 31 to slice a disk from the billet. The thickness of the disk is determined by the axial spacing of tool 39 from end face 37. Typically, the disk will have an axial thickness of about 0.04 inch.

Figure 4:
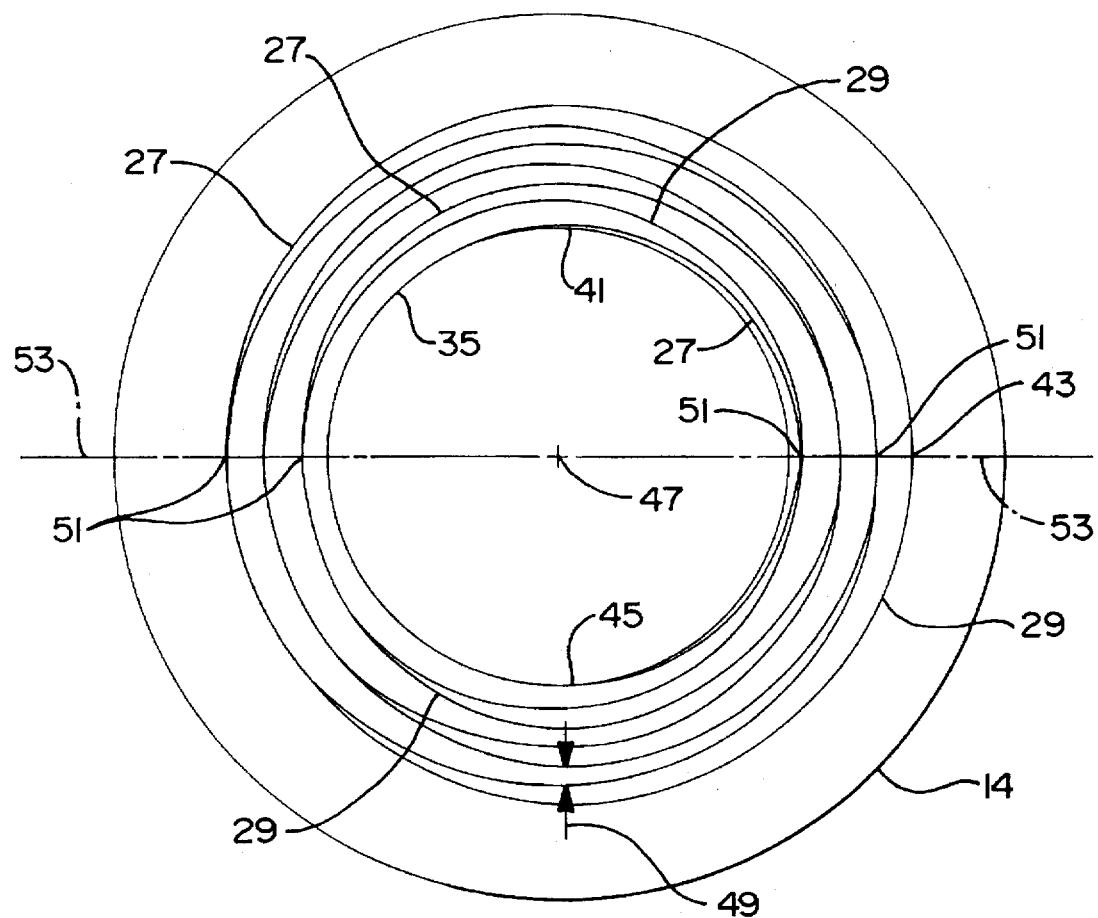
FIG. 4 is a plan view of a sealing disk embodying features of the invention.

FIG. 4 shows a plan view of the disk formed by grooving tool 33 and cut-off tool 39. One spiral groove 27 spirals outwardly in a clockwise direction from inner edge 35 of the disk. The other spiral groove 29 spirals outwardly from inner edge 35 of the disk in a counterclockwise direction. Each spiral groove makes at least one full turn around the disk central axis.

The two spiral grooves 27,29 are staggered about 180° apart so that each turn on groove 27 has two intersection points with the corresponding turn on groove 29. Although only one helical or spiral groove is illustrated in each direction of rotation, multiple grooves spaced circumferentially from one another may be formed in each direction of rotation. Such sets of grooves are known in the art as "multiple start" grooves or threads.

Spiral groove 27 has an inner end 41 at the disk inner edge 35 and an outer end 43 located at an intermediate point between the inner and outer edges of the disk. Spiral groove 29 has an inner end 45 located on disk inner edge 35 and an outer end coincident with end point 43 of spiral groove 27. The grooves may extend over the full radial extent of the disk 14 or may be limited to a central portion or any other portion, as may be required for particular applications.

The two spiral grooves 27,29 may be formed by feeding the grooving tool radially outwardly to form groove 27 and then radially inwardly to form groove 29. Common end point 43 for the two grooves corresponds with the point in time when the direction of tool feed is reversed. The entire tool movement cycle may be virtually continuous so as to expedite machining time and increase productivity.

Figure 5:
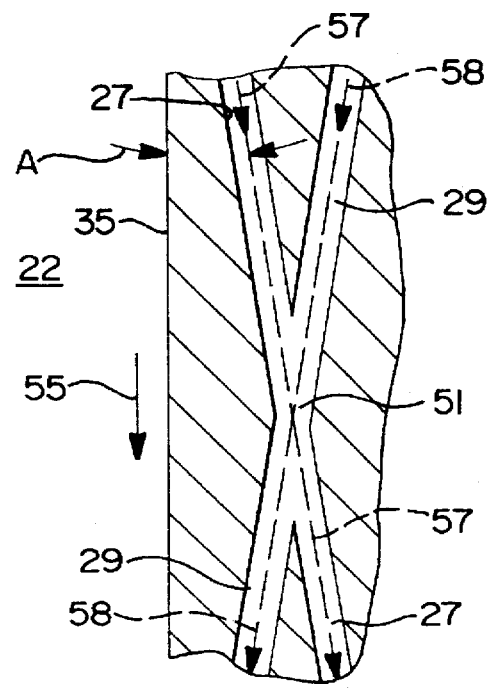
FIG. 5 is a fragmentary, magnified view of a groove intersection structure embodied in a groove system used in the FIG. 4 sealing disk.

Grooves 27,29 preferably have the same angle of approach or tangency relative to circles centered on disk axis 47. Typically, the angle of tangency or pitch for each groove 27,29 is less than 1°. Angle A in FIG. 5 represents this pitch angle.

FIG. 4 shows the two grooves 27,29 radially separated at the points of widest separation by relatively large radial distances. In FIG. 4, the maximum radial separation distance between corresponding turns on the two grooves is indicated by numeral 49. Separation distance 49 is exaggerated in FIG. 4 to illustrate the spiral nature of the two spiral grooves 27,29. In an actual representative sealing disk, the maximum separation distance 49 may be only about 0.025 inch. Each spiral groove has a width dimension measuring on the order of about 0.001 inch or 0.002 inch.

As previously noted, the two spiral grooves 27,29 are staggered about 180° apart. Thus, groove 27 has a starting point 41 staggered 180° from the starting point 45 of spiral groove 29. The two spiral grooves have intersection points 51 located on an imaginary diameter 53 extending through disk axis 47. However, any initial spacing between the starting points of grooves 27,29 may be used.

Grooves 27,29 have a common connection or intersection point 43 where the two grooves meet or overlap to collectively form a single channel spiralling outwardly from disk inner edge 35 in one direction at one side of point 43 and then back to the disk inner edge in the other direction at the other side of point 43.

During rotary motion of shaft 18 in one direction, liquid such as oil is primarily carried into one of the spiral grooves and circulates through the groove system and returns to the oil side 22 of the seal via the inner end of the spiral groove.

FIG. 5 illustrates, in greatly magnified form, an intersection point 51 between groove 27 and groove 29. Assuming the shaft is rotating in the direction of arrow 55, there will be a small flow of oil along groove 27 in the arrow 57 direction and a larger flow of oil in the arrow 58 direction. Some of the oil may flow into the downstream portion of groove 27, however, the remaining major portion of the oil will flow into the downstream portion of groove 29 to be returned to the liquid zone 22.

Each groove intersection point 51 represents a potential directional change point for the liquid flowing into the intersection point. The actual amount and direction of flow out of the intersection point is determined by the relative resistances or static pressures in the two grooves on the downstream side of the intersection point. Eventually, the oil will recirculate through a portion of the groove system and then back to the inner edge 35 of the sealing disk.

When the direction of shaft rotation reverses, the directions of flow through grooves 27,29 also reverses with the majority of the flow traveling through groove 27 toward edge 35.

The spiral groove design permits a relatively narrow groove width dimension, e.g., about 0.001 or 0.002 inch, using a simple and efficient machining process. It is difficult to form extremely narrow precision grooves using molding processes or other forming methods. With the herein described grooving process, the grooving tool can be fed radially in one direction to form one spiral groove and then fed radially in the other direction to form the other spiral groove. The grooving operation is accomplished quickly and with a desired degree of precision using a numerically controlled or programmed machine.

The drawings show a spiral groove system that includes one groove spiralled in the clockwise direction and a second groove spiralled in the counterclockwise direction. However, a groove system is possible wherein there are two or more separate grooves spiralling in the clockwise direction, and two or more grooves spiralling in the counterclockwise direction.

Variants of the illustrated groove system are possible while still practicing the invention.

What is claimed is:

1. A shaft seal, comprising:
   an annular plastic disk having an outer edge and an inner edge concentric around a central axis of the disk, said disk having a sealing surface engageable with a shaft surface around the inner edge of the disk and
   first and second spiral grooves provided in said sealing surface for pumping liquid through said grooves, said first groove being spiralled in a first direction and said second groove being spiralled in a second opposite direction; and,
   each spiral groove defining at least one complete turn around the disk axis, said grooves being staggered so that each turn on said first groove intersects with a corresponding turn on said second groove.

2. The seal of claim 1, wherein said spiral grooves have the same pitch angle.

3. The seal of claim 1, wherein the intersection between the first and second grooves define a plurality of intersection points located on a diameter extending through the disk axis.

4. The seal mechanism of claim 1, wherein said spiral grooves have the same angle of tangency relative to a circle centered on the disk axis, said angle of tangency being substantially less than one degree.

5. The seal mechanism of claim 1, wherein said first groove comprises an inner end located toward the inner edge of the disk and an outer end located at an intermediate point between the inner and outer edges of the disk, said second groove having an outer end connected to the outer end of said first groove.

6. The seal mechanism of claim 1, wherein said first groove spirals outwardly from a position adjacent the disk inner edge to a predetermined point on the disk sealing surface, and said second groove spirals inwardly from said predetermined point toward the disk inner edge.

7. The seal mechanism of claim 1, wherein said first and second spiral grooves have connected outer ends whereby said grooves form a continuous channel.

8. The seal mechanism of claim 1, wherein the radial spacing between the turns of each spiral groove is at least ten times the width of each groove.

9. The seal mechanism of claim 8, wherein the width of each groove is no more than about 0.002 inch.

* * * * *